(12) United States Patent
Kweon et al.

(10) Patent No.: US 12,418,596 B2
(45) Date of Patent: Sep. 16, 2025

(54) UPF SERVICE-BASED PACKET DELAY STATUS EVENT EXPOSURE SERVICE METHOD AND DEVICE

(71) Applicant: Samsung Electronics Co., Ltd., Gyeonggi-do (KR)

(72) Inventors: Kisuk Kweon, Gyeonggi-do (KR); Sangsoo Jeong, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 0 days.

(21) Appl. No.: 18/468,165

(22) Filed: Sep. 15, 2023

(65) Prior Publication Data
US 2024/0048462 A1 Feb. 8, 2024

Related U.S. Application Data

(63) Continuation of application No. 17/912,267, filed as application No. PCT/KR2021/003363 on Mar. 18, 2021, now Pat. No. 11,765,055.

(30) Foreign Application Priority Data

Mar. 23, 2020 (KR) ........................ 10-2020-0035082

(51) Int. Cl.
*H04L 41/5051* (2022.01)
*H04L 43/0852* (2022.01)
*H04L 67/55* (2022.01)

(52) U.S. Cl.
CPC .......... *H04L 67/55* (2022.05); *H04L 41/5051* (2013.01); *H04L 43/0852* (2013.01)

(58) Field of Classification Search
CPC ........................ H04L 41/5051; H04L 43/0852
See application file for complete search history.

(56) References Cited

U.S. PATENT DOCUMENTS 10,531,420 B2   1/2020  Li et al.
10,645,749 B2   5/2020  Kim et al.
(Continued)

FOREIGN PATENT DOCUMENTS

CN   110249667         9/2019
CN   110249667 A   *   9/2019   ............ H04W 24/10
(Continued)

OTHER PUBLICATIONS

PCT/ISA/210 Search Report issued on PCT/KR2021/003363, Jun. 28, 2021 pp. 5.
(Continued)

*Primary Examiner* — Richard G Keehn
(74) *Attorney, Agent, or Firm* — The Farrell Law Firm, P.C.

(57) ABSTRACT

The present disclosure relates to: a communication technique merging IoT technology with a 5th generation (5G) or pre-5G communication system for supporting a data transmission rate higher than that of a 4th generation (4G) communication system such as long term evolution (LTE); and a system therefor. The present disclosure can be applied to intelligent services (for example, smart homes, smart buildings, smart cities, smart cars or connected cars, healthcare, digital education, retail, security- and safety-related services, and the like) on the basis of 5G communication technology and IoT-related technology. According to various embodiments of the present invention, a method and device for requesting packet delay status by using an UPF event exposure service be provided.

20 Claims, 8 Drawing Sheets

(56) References Cited

U.S. PATENT DOCUMENTS

| | | | | |
|---|---|---|---|---|
| 10,805,983 | B2* | 10/2020 | Talebi Fard | H04W 68/02 |
| 11,638,316 | B2* | 4/2023 | Liao | H04W 76/22 |
| | | | | 370/329 |
| 2018/0317157 | A1* | 11/2018 | Baek | H04W 28/16 |
| 2019/0159227 | A1* | 5/2019 | Talebi Fard | H04W 36/0011 |
| 2019/0166016 | A1 | 5/2019 | Livanos et al. | |
| 2019/0174449 | A1* | 6/2019 | Shan | H04W 60/04 |
| 2019/0182875 | A1* | 6/2019 | Talebi Fard | H04W 76/11 |
| 2019/0215730 | A1* | 7/2019 | Qiao | H04W 28/0268 |
| 2019/0306251 | A1* | 10/2019 | Talebi Fard | H04W 76/10 |
| 2019/0394833 | A1* | 12/2019 | Talebi Fard | H04W 68/005 |
| 2020/0053828 | A1* | 2/2020 | Bharatia | H04W 76/11 |
| 2020/0107213 | A1* | 4/2020 | Park | H04W 4/24 |
| 2020/0196375 | A1* | 6/2020 | Ryu | H04W 76/34 |
| 2020/0228936 | A1* | 7/2020 | Talebi Fard | H04W 4/08 |
| 2020/0337093 | A1* | 10/2020 | Kim | H04W 64/00 |

FOREIGN PATENT DOCUMENTS

| | | | |
|---|---|---|---|
| EP | 3 577 959 | 12/2019 | |
| EP | 3577959 A1 * | 12/2019 | ......... H04L 65/1063 |
| EP | 4 009 731 | 6/2022 | |
| EP | 4009731 A1 * | 6/2022 | ......... H04L 12/1407 |
| KR | 10-2019-0044661 | 4/2019 | |
| KR | 10-2019-0119490 | 10/2019 | |
| WO | WO 2019/196846 | 10/2019 | |
| WO | WO 2019/197883 | 10/2019 | |
| WO | WO-2019196846 A1 * | 10/2019 | ........... H04L 67/142 |
| WO | WO 2020/020295 | 1/2020 | |
| WO | WO-2020020295 A1 * | 1/2020 | ............ H04W 76/11 |

OTHER PUBLICATIONS

PCT/ISA/237 Written Opinion issued on PCT/KR2021/003363, Jun. 28, 2021, pp. 4.

3GPP; TSG SA; Procedures for the 5G System (5GS); Stage 2 (Release 16), 3GPP TS 23.502 V16.3.0, Dec. 22, 2019, pp. 560.

Ericsson, "Nupf eventexposure", S2-1901733, 3GPP TSG-SA WG2 Meeting #131, Santa Cruz, Tenerife, Spain, Feb. 19, 2019, pp. 5.

Korean Office Action dated May 27, 2025 issued in counterpart application No. 10-2020-0035082, 11 pages.

* cited by examiner

UPF SERVICE-BASED PACKET DELAY STATUS EVENT EXPOSURE SERVICE METHOD AND DEVICE

PRIORITY

This application is a continuation of U.S. application Ser. No. 17/912,267, which was filed in the U.S. Patent and Trademark Office on Sep. 16, 2022, which is a National Phase Entry of PCT International Application No. PCT/KR2021/003363, which was filed on Mar. 18, 2021, and claims priority to Korean Patent Application No. 10-2020-0035082, which was filed on Mar. 23, 2020, the entire content of each of which is incorporated herein by reference.

BACKGROUND

1. Field

The disclosure relates to a communication system, and more particularly, to a method and device for requesting a packet delay status using a UPF event exposure service.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post long term evolution (LTE) system.

In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system.

Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed.

Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

The 5G system is considering support for various services compared to the existing 4G system. For example, the most representative services may include an enhanced mobile broad band (eMBB), ultra-reliable and low latency communication (URLLC), massive machine type communication (mMTC), evolved multimedia broadcast/multicast service (eMBMS), and the like. A system providing the URLLC service may be referred to as a URLLC system, and a system providing the eMBB service may be referred to as an eMBB system. Further, terms service and system may be used interchangeably.

The URLLC service is a service newly considered in the 5G system, unlike the existing 4G system and requires a service newly considered in the 5G system, and requires ultra-high reliability (e.g., about 10-5 packet error rate) and low latency (e.g., about 0.5 msec) requirements compared to other services. In order to satisfy these strict requirements, the URLLC service may need to apply a shorter transmission time interval (TTI) than the eMBB service, and various operating methods are being considered using this.

Innovation of Internet from a human-centered connection network in which a human generates and consumes information to an Internet of Things (IoT) network that gives and receives and processes information to and from distributed constituent elements such as things has occurred. Internet of everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things.

In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and hightech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

As various services may be provided according to the above-mentioned description and the development of mobile communication systems, a method for efficiently using a non-public network (NPN) is particularly required.

SUMMARY

The disclosure provides a method and device for effectively providing a service in a wireless communication system.

The technical problems to be achieved in the disclosure are not limited to the technical problems mentioned above, and other technical problems not mentioned will be clearly understood by those of ordinary skill in the art to which the disclosure belongs from the description below.

An embodiment of the disclosure proposes a method of providing packet delay status monitoring for an URLLC service based on an UPF event exposure service.

According to an embodiment of the disclosure, a method performed by a network exposure function (NEF) in a wireless communication system may include receiving, from an application function (AF), a first message requesting registration of an event subscription service to a user plane function (UPF); transmitting, to another network entity, a second message requesting information on the UPF; receiving, from the another network entity, a third message including the information on the UPF; and transmitting, to the UPF selected based on the information on the UPF, a fourth message requesting registration of the event subscription service.

Further, the second message may include at least one of a generic public subscription identifier (GPSI), an Internet protocol (IP) address of a terminal, a medium access control (MAC) address of the terminal, a data network name (DNN), slice information, or a subscription permanent identifier (SUPI).

Further, the another network entity may be a binding support function (BSF) or a policy control function (PCF).

Further, the method may further include receiving, from the UPF, a fifth message including information indicating occurrence of the subscribed event; and transmitting, to the AF, a sixth message including the information indicating occurrence of the event.

Further, at least one of a case that information indicating that information on the UPF is requested is included in the second message, information for identifying the UPF is included in the second message, or the second message is a preconfigured message requesting information on the UPF, the another network entity recognizes that the second message requests information on the UPF.

According to an embodiment of the disclosure, a method performed by an application function (AF) in a wireless communication system may include transmitting, to a binding support function (BSF), a first message requesting information on a user plane function (UPF); receiving, from the BSF, a second message including the information on the UPF; and transmitting, to the UPF selected based on the information on the UPF, a third message requesting registration of an event subscription service.

Further, the first message may include at least one of a generic public subscription identifier (GPSI), an Internet protocol (IP) address of a terminal, a medium access control (MAC) address of the terminal, a data network name (DNN), slice information, or a subscription permanent identifier (SUPI).

Further, the method may further include receiving, from the UPF, a fourth message including information indicating occurrence of the subscribed event.

According to an embodiment of the disclosure, a network exposure function (NEF) of a wireless communication system may include a transceiver; and a controller configured to control to receive, from an application function (AF) via the transceiver, a first message requesting registration of an event subscription service to a user plane function (UPF), transmit, to another network entity via the transceiver, a second message requesting information on the UPF, receive, from the another network entity via the transceiver, a third message including the information on the UPF, and transmit, to the UPF selected based on the information on the UPF via the transceiver, a fourth message requesting registration of the event subscription service.

According to an embodiment of the disclosure, an application function (AF) of a wireless communication system may include a transceiver; and a controller configured to control to transmit, to a binding support function (BSF) via the transceiver, a first message requesting information on a user plane function (UPF), receive, from the BSF via the transceiver, a second message including the information on the UPF, and transmit, to the UPF selected based on the information on the UPF via the transceiver, a third message requesting registration of an event subscription service.

According to an embodiment of the disclosure, it is possible to provide a device and method for effectively providing a service in a wireless communication system.

The effects obtainable in the disclosure are not limited to the above-mentioned effects, and other effects not mentioned will be clearly understood by those of ordinary skill in the art to which the disclosure belongs from the description below.

DETAILED DESCRIPTION

Figure 1:
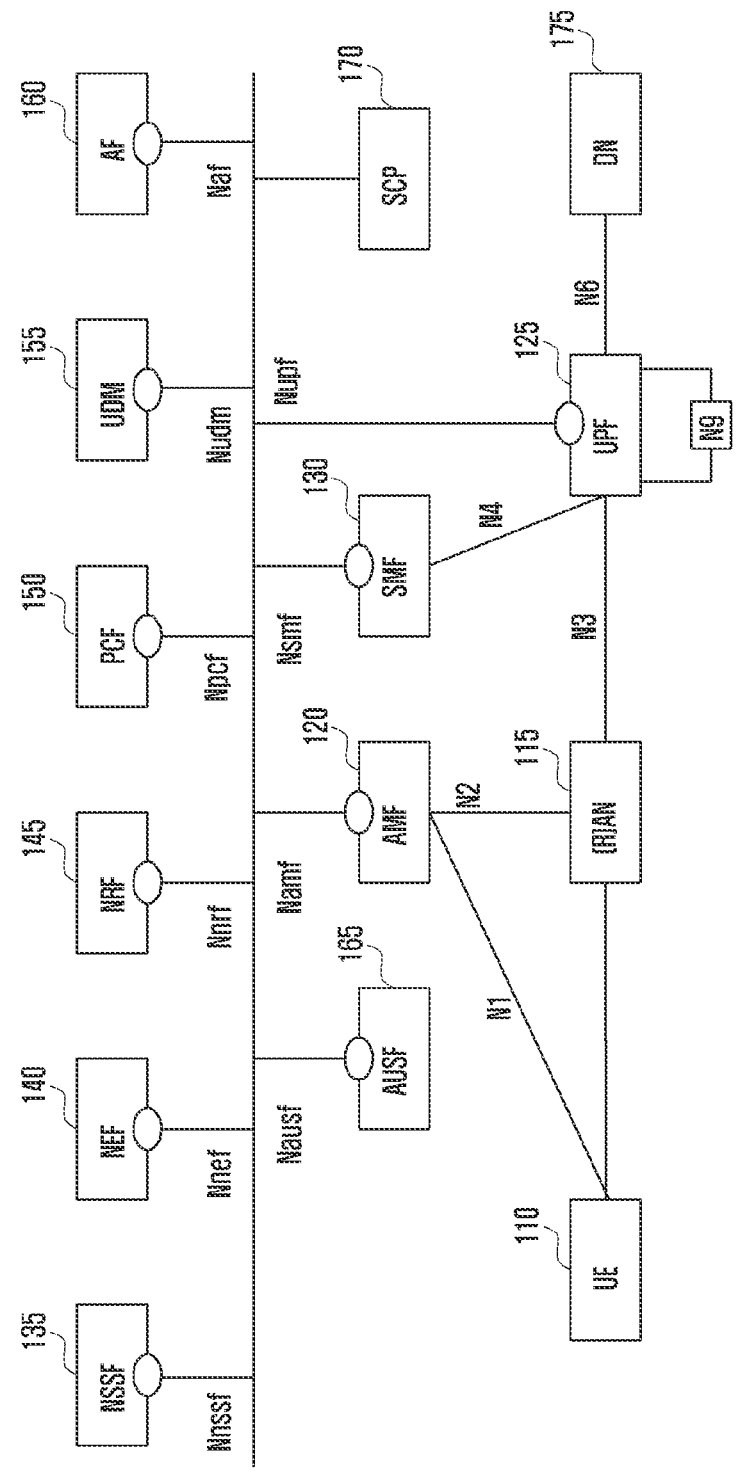
FIG. 1 illustrates a structure of a 5G network according to an embodiment of the disclosure.

Hereinafter, preferred embodiments of the disclosure will be described in detail with reference to the accompanying drawings. In this case, it should be noted that in the accompanying drawings, the same components are denoted by the same reference numerals if possible. Further, detailed descriptions of well-known functions and configurations that may obscure the gist of the disclosure will be omitted.

In describing embodiments in this specification, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only embodiments of the disclosure enable the disclosure to be complete, and are provided to fully inform the scope of the disclosure to those of ordinary skill in the art to which the disclosure belongs, and the disclosure is only defined by the scope of the claims. Like reference numerals refer to like components throughout the specification.

In this case, it will be understood that each block of message flow diagrams and combinations of the message flow diagrams may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the message flow diagram block(s).

Further, each block may represent a module, a segment, or a portion of a code including one or more executable instructions for executing a specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term '-unit' used in this embodiment means software or hardware components such as FPGA or ASIC, and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card.

Hereinafter, the base station is a subject performing resource allocation of the terminal and may be at least one of a node B, base station (BS), eNode B (eNode B), gNB (gNode B), radio access unit, base station controller, or a node on the network. The terminal may include a user equipment (UE), a mobile station (MS), a cellular phone, a smart phone, a computer, or a multimedia system capable of performing a communication function. Further, the embodiment of the disclosure may be applied to other communication systems having a similar technical background or channel type to the embodiment of the disclosure described below. Further, the embodiments of the disclosure may be applied to other communication systems through some modifications within a range that does not significantly depart from the scope of the disclosure as determined by a person having skilled technical knowledge.

A term for identifying an access node used in the following description, a term referring to a network entity or a network function (NF), a term referring to messages, a term referring to an interface between network objects, and terms referring to various identification information are exemplified for convenience of description. Accordingly, the disclosure is not limited to the terms described below, and other terms referring to objects having equivalent technical meanings may be used.

Hereinafter, for convenience of description, some terms and names defined in the 3rd generation partnership project long term evolution (3GPP) standard may be used. However, the disclosure is not limited by the above terms and names, and may be equally applied to systems conforming to other standards.

Embodiments of the disclosure provide a method in which an external/internal application function (AF) 160 in a 5G core (5GC) may use a packet delay status service provided to a user plane function (UPF) event exposure service using a service-based interface (SBI).

FIG. 1 illustrates a structure of a 5G network according to an embodiment of the disclosure.

With reference to FIG. 1, descriptions of network entities or network nodes constituting a 5G network are as follows.

An (radio) access network ((R)AN) 115 is a subject that performs radio resource allocation of a terminal 110 and may be an at least one of an eNode B, a node B, a base station (BS), a next generation radio access network (NG-RAN), a 5G-AN, a radio access unit, a base station controller, or a node on a network. The terminal 110 may include a user equipment (UE), a next generation UE (NG UE), a mobile station (MS), a cellular phone, a smart phone, a computer, or a multimedia system capable of performing a communication function.

Hereinafter, although the embodiment of the disclosure is described by taking the 5G system as an example, the embodiment of the disclosure may be applied to other communication systems having a similar technical background. Further, the embodiments of the disclosure may be applied to other communication systems through some modifications within a range that does not significantly depart from the scope of the disclosure as determined by a person having skilled technical knowledge.

The wireless communication system defines a next generation (gen) core (NG core) or a 5G core network (5GC), which is a new core network as it evolves from a 4G system to a 5G system. The new core network virtualized all the existing network entities (NEs) and made it into a network function (NF). According to an embodiment of the disclosure, a network function may mean a network entity, a network component, and a network resource.

According to an embodiment of the disclosure, a 5GC may include NFs illustrated in FIG. 1. The 5GC is not limited to an example of FIG. 1 and may include a larger number of NFs or a smaller number of NFs than that illustrated in FIG. 1.

According to an embodiment of the disclosure, an access and mobility management function (AMF) 120 may be a network function for managing the mobility of the terminal 110.

According to an embodiment of the disclosure, a session management function (SMF) 130 may be a network function for managing a packet data network (PDN) connection provided to the terminal 110. The PDN connection may be referred to as a protocol data unit (PDU) session.

According to an embodiment of the disclosure, a policy control function (PCF) 150 may be a network function that applies a service policy of a mobile communication operator to a terminal, a charging policy, and a policy for a PDU session.

According to an embodiment of the disclosure, unified data management (UDM) 155 may be a network function for storing information on a subscriber.

According to an embodiment of the disclosure, a network exposure function (NEF) 140 may be a function of providing information on the terminal to a server outside the 5G network. Further, the NEF 140 may provide a function of providing information necessary for providing a service to the 5G network and storing the information in a user data repository (UDR) (not illustrated).

According to an embodiment of the disclosure, a user plane function (UPF) 125 may be a function that serves as a gateway for transferring user data (PDU) to a data network (DN) 175. In particular, in the disclosure. Nupf, which is an SBI interface, is defined to the UPF 125, thereby providing an event exposure service to other NFs.

According to an embodiment of the disclosure, a network repository function (NRF) 145 may perform a function of discovering the NF.

According to an embodiment of the disclosure, an authentication server function (AUSF) 165 may perform terminal authentication in a 3GPP access network and a non-3GPP access network.

According to an embodiment of the disclosure, a network slice selection function (NSSF) 135 may perform a function of selecting a network slice instance provided to the terminal 140.

According to an embodiment of the disclosure, a service communication proxy (SCP) 170 may provide an indirect communication method that substitutes for service search, call, response, and the like in interworking between NFs.

According to an embodiment of the disclosure, the DN 175 may be a data network in which the terminal 110 transmits and receives data in order to use a service of a network provider or a 3rd party service.

Figure 2:
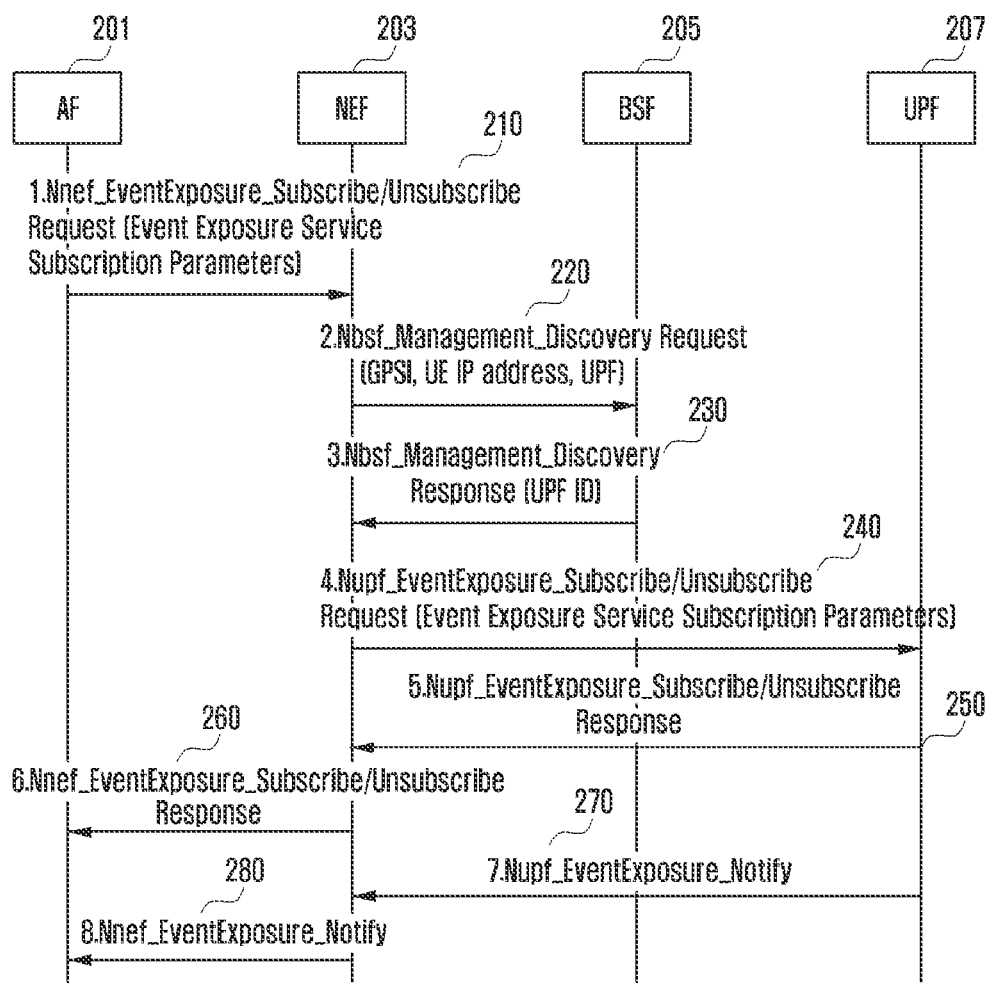
FIG. 2 illustrates a procedure for an external AF to use a packet delay status event exposure service according to an embodiment of the disclosure.

FIG. 2 illustrates a procedure for an external AF to use a packet delay status event exposure service according to an embodiment of the disclosure.

With reference to FIG. 2, in step 210, in order to subscribe or cancel a subscription to a packet delay status event exposure service, an AF 201 may transmit a service subscription request or cancellation message (Nnef_EventExposure_Subscribe/Unsubscribe request) to an NEF 203. In order to cancel a subscription, a subscription correlation ID that identifies the existing event service subscription should be sent together. The subscription request message may include at least one of the following parameters.

Event ID(s)
    Packet Delay Status (PDS)
Target of Event Reporting
    It may be any combination of a generic public subscription identifier (GPSI), external group identifier, UE IP address (IPv4 address or IPv6 prefix), UE medium access control (MAC) address, AF-Service-Identifier. or data network name (DNN)/S-NSSAI (network slice selection assistance information) combination information.
QoS Flow Detection Information (Traffic Descriptor Information)
    Source address: UE IP address (IPv4 address or IPv6 prefix), UE MAC address
        Destination address: Server IP address (IPv4 address or IPv6 prefix). UE MAC address
    Source (UE) port number
    Destination (Server) port number
    Protocol ID (IPv4) or Next Header type (IPv6)
    Flow Label (IPv6)
        Ethertype (Ethernet)
Event Reporting Information
    Event reporting mode
        Periodic, one time, on event detection
    Immediate reporting flag
    Minimum waiting time if reporting frequency: event detection
Notification Target Address (+Notification Correlation ID)
    AF ID (address), NEF ID (address)
Event Filter Information
    Reporting frequency: event detection
        Event Parameter Type1 (Event Parameter Value1)
        DL packet delay (threshold of the DL packet delay)
        Event Parameter Type2 (Event Parameter Value2)
        UL packet delay (threshold of the UL packet delay)
        Event Parameter Type1 (Event Parameter Value1)
        Round trip packet delay (threshold of the round trip packet delay)
    Reporting frequency: periodic
        Event Parameter Type1 (Event Parameter Value1)
        DL packet delay (reporting time period)
        Event Parameter Type2 (Event Parameter Value2)
        UL packet delay (reporting time period)
        Event Parameter Type1 (Event Parameter Value1)
        Round trip packet delay (reporting time period)
    Reporting frequency: one time
        Event Parameter Type1 (Event Parameter Value1)
DL packet delay (PDU Session is released)
Event Parameter Type2 (Event Parameter Value2)
UL packet delay (PDU Session is released)
Event Parameter Type1 (Event Parameter Value1)
Round trip packet delay (PDU Session is released)
Expiry time
    The time up to which the subscription is desired to be kept as active In step 220, in order to find a UPF through which a specific service data flow (SDF) or packet flow passes, the NEF 203 may transmit an Nbsf_Management_Discovery request message to a binding support function (BSF) 205. The operation provides a search for a PCF or an UPF in charge of a specific PDU session. An input value may be a combination of an UE IP address (IPv4 address or IPv6 prefix), an UE MAC address. DNN, DN information (e.g., S-NSSAI), subscription permanent identifier (SUPI), GPSI, and the like. In step 210, when the NEF 203 receives an AF-service-identifier as a target of event reporting value, the NEF 203 may change the AF-service-identifier to a DNN/S-NSSAI combination. Further, in order to designate a discovering NF to be searched, (PCF or UPF) may be designated as an input value of the function. Alternatively, in the case that the Nbsf_Management_Discovery request message includes information that may use for identifying the UPF, the Nbsf_Management_Discovery request message is a message requesting information on the UPF (e.g., UPF ID), and the BSF that has received this may recognize it. Another method is to differentiate the discovering NF to change a name of a service operation. That is, when searching for the UPF, the Nbsf_management_Discovery_UPF request (GPSI, UE IP address) service operation is used, and when searching for a PCF, an Nbsf_management_Discovery_PCF request (GPSI, UE IP address) is used. Another method is to differentiate the search target NF using a "TYPE" parameter. For example, there may be a method in which TYPE1 is defined as a PCF. TYPE2 is defined as a UPF, and TYPE3 is defined when both a PCF and a UPF are searched at the same time. For example, when searching for a UPF, it is used as in an Nbsf_management_Discovery_Request (GPSI, UE IP address. TYPE2). When the NEF 203 receives an external group identifier as an input value in step 210, the NEF 203 may search for all UPFs in charge of all UEs belonging to the group and send a service subscription request.

In step 230, the BSF 205 may transmit identification information (e.g., ID of a UPF 207) of the UPF 207 requested to search using the GPSI and the UE IP address to the NEF 203 through the Nbsf_management_Discovery response message. In order to search for the UPF 207, the NEF 203 may use any combination of a UE IP address (IPv4 address or IPv6 prefix), UE MAC address, AF-service-identifier. DNN. DN information (e.g., S-NSSAI), SUPI, or GPSI values.

In step 240, in order to subscribe or cancel a subscription to the packet delay status event exposure service, the NEF 203 may transmit a service subscription request or cancellation message (Nupf_EventExposure_Subscribe/Unsubscribe request) to the UPF 207. In order for the NEF 203 to cancel a subscription, the NEF 203 may send together a subscription correlation ID identifying an existing event service subscription to the UPF 207. When the NEF 203 receives an AF-service-identifier as the target of event reporting value in step 210, the NEF 203 may change the AF-service-identifier to a DNN/S-NSSAI combination. The NEF 203 may add an address thereof to the notification target address and information received from the AF 201 in step 210 and transmit it to the UPF 207. This is for the NEF 203 to receive a notification on a change when a change of information subscribed to the UPF 207 occurs. When the service subscription is authorized by the UPF 207, the UPF 207 may store the event trigger and the identity of the requester.

The UPF 207 may perform a packet delay status event exposure service for a specific QoS flow of a specific UE through target of event reporting information. The specific QoS flow may be specified through traffic detection information in target of event reporting information. The UPF 207 may report to an event exposure service subscriber at an event detection/periodic/one time period according to the reporting frequency in event filter information. The UPF 207 may report the DL packet delay/UL packet delay/round trip packet delay value to the subscriber every corresponding period. The event detection period may be notified to the subscriber when the packet delay is a threshold or more. The periodic period may be reported to the subscriber at every reporting time period interval. One time period may be reported to the subscriber when a PDU session in which the corresponding QoS flow flows is released. Event reporting information may include an event reporting mode and include an immediate reporting flag indicating whether to immediately send reporting to the subscriber. A minimum waiting time if reporting frequency indicates a time value to wait until at least the next report after detecting an event and reporting it to the subscriber in the event detection period. This is to prevent frequent reports due to events occurring too frequently.

The UPF 207 may measure the DL, UL and round trip packet delay of an N3 interface with the NG-RAN in order to measure the packet delay for a specific QoS flow, and the packet delay between the UE and the NG-RAN may be measured by requesting to the NG-RAN.

In step 250, the UPF 207 may transmit a Nupf_EventExposure_Subscribe/Unsubscribe response message to the NEF 203 in response to a subscription or cancellation of a subscription to the service. The message may include a subscription correlation ID and an expiry time.

In step 260, the NEF 203 may transmit a Nnef_EventExposure_Subscribe/Unsubscribe response message to the AF 201 in response to a subscription or cancellation of a subscription to the service. The message may include a subscription correlation ID and an expiry time.

In step 270, the UPF 207 may detect occurrence of an event and transmit the event report together with a time stamp to the NEF 203 through a Nupf_EventExposure_Notify message.

The NEF 203 may store event report information together with the time stamp in a UDR (not illustrated) using a Nudr_DM_Create or Nudr_DM_Update message.

In step 280, the NEF 203 may transmit the received event report to the AF 201 through Nnef_EventExposure_Notify.

Figure 3:
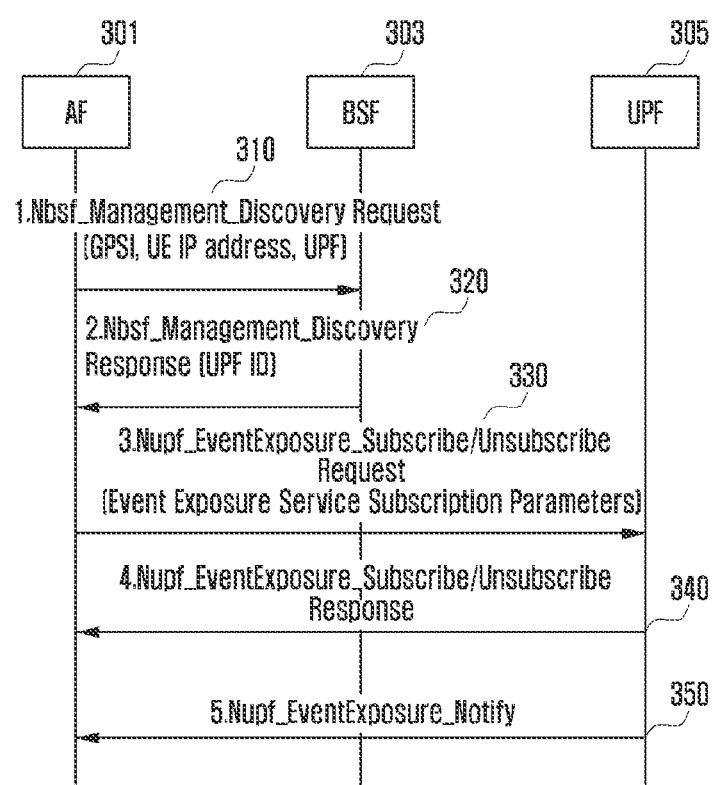
FIG. 3 illustrates a procedure for an internal AF to use a packet delay status event exposure service according to an embodiment of the disclosure.

FIG. 3 illustrates a procedure for an internal AF to use a packet delay status event exposure service according to an embodiment of the disclosure.

The embodiment illustrated in FIG. 3 is similar to the procedure of the embodiment illustrated in FIG. 2, except that the NEF 203 is not used for subscribing to a packet delay status event exposure service because an AF 301 is in a network.

With reference to FIG. 3, in step 310, in order to find a UPF through which a specific SDF or packet flow passes, the AF 301 may transmit an Nbsf_Management_Discovery request message to a binding support function (BSF) 303. The operation provides a search for a PCF or a UPF in charge of a specific PDU session. An input value may be a combination of an UE IP address (IPv4 address or IPv6 prefix), an UE MAC address, a DNN. DN information (e.g., S-NSSAI). SUPI, GPSI, and the like. Further, in order to designate a discovering NF to be searched. (PCF or UPF) may be designated as an input value of the function. Another method may be to differentiate the discovering NF to change the name of the service operation. That is, there may be a method of using an Nbsf_management_Discovery_UPF request (GPSI, UE IP address) service operation when searching for the UPF and using an Nbsf_management_Discovery_PCF request (GPSI, UE IP address) when searching for the PCF. As another method, there may be a method of differentiating a search target NF using a "TYPE" parameter. For example, TYPE1 may be defined as the PCF. TYPE2 may be defined as the UPF, and TYPE3 may be defined when both the PCF and the UPF are searched at the same time. For example, when searching for the UPF, it may be used as in Nbsf_management_Discovery_Request (GPSI, UE IP address. TYPE2).

In step 320, the BSF 303 may transmit the identification information (e.g., ID of a UPF 305) of the UPF 305 requested to search using the GPSI and the UE IP address to the AF 301 through the Nbsf_management_Discovery response message. In order to search for the UPF 305, the AF 301 may use any combination of a UE IP address (IPv4 address or IPv6 prefix), UE MAC address, AF-Service-Identifier, DNN, DN information (e.g., S-NSSAI), SUPI, or GPSI values.

In step 340, in order to subscribe or unsubscribe to the packet delay status event exposure service, the AF 301 may transmit a service subscription request or cancellation message (Nupf_EventExposure_Subscribe/Unsubscribe request) to the UPF 305. In order to cancel a subscription, the AF 301 may send a subscription correlation ID that identifies an existing event service subscription together with the service subscription cancellation message to the UPF 305. When the service subscription is authorized by the UPF 305, the UPF 305 may store the event trigger and the identity of the requester. The subscription request message may include at least one of the following parameters.

Event ID(s)
Packet Delay Status (PDS)
Target of Event Reporting
   It may be any combination of a generic public subscription identifier (GPSI), external group identifier. UE IP address (IPv4 address or IPv6 prefix), UE MAC address. AF-Service-Identifier, or DNN/S-NSSAI combination information.
QoS Flow Detection Information (Traffic Descriptor Information)
Source address: UE IP address (IPv4 address or IPv6 prefix). UE MAC address
Destination address: Server IP address (IPv4 address or IPv6 prefix), UE MAC address
Source (UE) port number
Destination (Server) port number
Protocol ID (IPv4) or Next Header type (IPv6)
Flow Label (IPv6)
Ethertype (Ethernet)
Event Reporting Information
Event reporting mode
Periodic, one time, on event detection
Immediate reporting flag
Minimum waiting time if reporting frequency: event detection
Notification Target Address (+Notification Correlation ID)
AF ID (address), NEF ID (address)
Event Filter Information
Reporting frequency: event detection
Event Parameter Type1 (Event Parameter Value1)
DL packet delay (threshold of the DL packet delay)
Event Parameter Type2 (Event Parameter Value2)
UL packet delay (threshold of the UL packet delay)
Event Parameter Type1 (Event Parameter Value1)
Round trip packet delay (threshold of the round trip packet delay)
Reporting frequency: periodic
Event Parameter Type1 (Event Parameter Value1)
DL packet delay (reporting time period)
Event Parameter Type2 (Event Parameter Value2)
UL packet delay (reporting time period)
Event Parameter Type1 (Event Parameter Value1)
Round trip packet delay (reporting time period)
Reporting frequency: one time
Event Parameter Type1 (Event Parameter Value1)
DL packet delay (PDU Session is released)
Event Parameter Type2 (Event Parameter Value2)
UL packet delay (PDU Session is released)
Event Parameter Type1 (Event Parameter Value1)
Round trip packet delay (PDU Session is released)
Expiry time
   The time up to which the subscription is desired to be kept as active The UPF 305 may perform a packet delay status event exposure service for a specific QoS flow of a specific UE through target of event reporting information. The specific QoS flow may be specified through traffic detection information in target of event reporting information. The UPF 305 may report to the event exposure service subscriber at an event detection/periodic/one time period according to the reporting frequency in the event filter information. The UPF 305 may report the DL packet delay/UL packet delay/round trip packet delay value to the subscriber every corresponding period. The event detection period may be notified to the subscriber when the packet delay is a threshold or more. The periodic period may be reported to the subscriber at every reporting time period interval. One time period may be reported to the subscriber when a PDU session in which the corresponding QoS flow flows is released. Event reporting information may include an event reporting mode and include an immediate reporting flag indicating whether to immediately send reporting to the subscriber. A minimum waiting time if reporting frequency indicates a time value to wait until at least the next report after detecting an event and reporting it to the subscriber in the event detection period. This is to prevent frequent reports due to events occurring too frequently.

The UPF 305 may measure DL. UL, and round trip packet delay of an N3 Interface with the NG-RAN in order to measure packet delay for a specific QoS flow, and packet delay between the UE and the NG-RAN may be measured by requesting to the NG-RAN.

In step 340, the UPF 305 may transmit a Nupf_EventExposure_Subscribe/Unsubscribe response message to the AF 301 in response to a subscription or cancellation of a subscription to a service. The message may include a subscription correlation ID and an expiry time.

In step 350, the UPF 305 may detect occurrence of an event and transmit the event report together with a time stamp to the AF 301 through a Nupf_EventExposure_Notify message.

Figure 4:
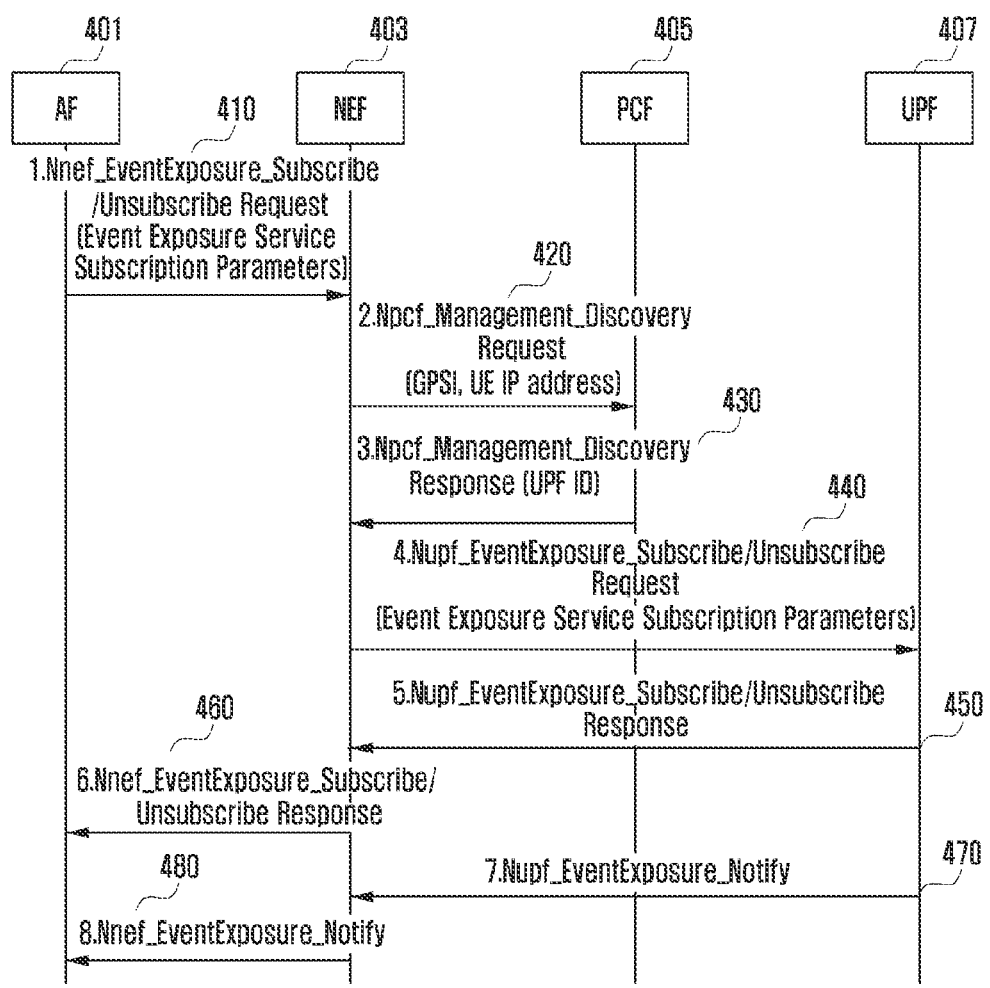
FIG. 4 illustrates a procedure for an external AF to use a packet delay status event exposure service according to an embodiment of the disclosure.

FIG. 4 illustrates a procedure for an external AF to use a packet delay status event exposure service according to an embodiment of the disclosure.

All procedures of the embodiment illustrated in FIG. 4 are basically the same as those in FIG. 2, but are different from those in FIG. 2 in that the PCF instead of the BSF is used for searching for the UPF. That is, the embodiment of FIG. 4 is similar to the embodiment illustrated in FIG. 2 except for steps 420 and 430.

With reference to FIG. 4, in step 410, in order to subscribe or cancel a subscription to a packet delay status event exposure service, an AF 401 may transmit a service subscription request or cancellation message (Nnef_EventExposure_Subscribe/Unsubscribe request) to an NEF 403. In order to cancel a subscription, a subscription correlation ID that identifies the existing event service subscription should be sent together. The subscription request message may include at least one of the following parameters.

Event ID(s)
Packet Delay Status (PDS)
Target of Event Reporting
   It may be any combination of a generic public subscription identifier (GPSI), external group identifier, UE IP address (IPv4 address or IPv6 prefix). UE MAC address. AF-Service-Identifier, and DNN/S-NSSAI combination information.
QoS Flow Detection Information (Traffic Descriptor Information)

Source address: UE IP address (IPv4 address or IPv6 prefix), UE MAC address
Destination address: Server IP address (IPv4 address or IPv6 prefix). UE MAC address
Source (UE) port number
Destination (Server) port number
Protocol ID (IPv4) or Next Header type (IPv6)
Flow Label (IPv6)
Ethertype (Ethernet)
Event Reporting Information
Event reporting mode
Periodic, one time, on event detection
Immediate reporting flag
Minimum waiting time if reporting frequency: event detection
Notification Target Address (+Notification Correlation ID)
AF ID (address), NEF ID (address)
Event Filter Information
Reporting frequency: event detection
Event Parameter Type1 (Event Parameter Value1)
DL packet delay (threshold of the DL packet delay)
Event Parameter Type2 (Event Parameter Value2)
UL packet delay (threshold of the UL packet delay)
Event Parameter Type1 (Event Parameter Value1)
Round trip packet delay (threshold of the round trip packet delay)
Reporting frequency: periodic
Event Parameter Type1 (Event Parameter Value1)
DL packet delay (reporting time period)
Event Parameter Type2 (Event Parameter Value2)
UL packet delay (reporting time period)
Event Parameter Type1 (Event Parameter Value1)
Round trip packet delay (reporting time period)
Reporting frequency: one time
Event Parameter Type1 (Event Parameter Value1)
DL packet delay (PDU Session is released)
Event Parameter Type2 (Event Parameter Value2)
UL packet delay (PDU Session is released)
Event Parameter Type1 (Event Parameter Value1)
Round trip packet delay (PDU Session is released)
Expiry time
The time up to which the subscription is desired to be kept as active In step 420, in order to find a UPF through which a specific SDF or packet flow passes, the NEF 403 may transmit an Npcf_Management_Discovery request message to a policy control function (PCF) 405. The operation provides a search for a UPF 407 in charge of a specific PDU session. An input value may be a combination of an UE IP address (IPv4 address or IPv6 prefix), an UE MAC address, a DNN, DN information (e.g., S-NSSAI), SUPI, GPSI, and the like. In step 410, when the NEF 403 receives an AF-Service-Identifier as a target of event reporting value, the NEF 403 may change the AF-Service-Identifier to a DNN/S-NSSAI combination. When the NEF 403 receives the external group identifier as an input value in step 410, the NEF 403 may search for all UPFs in charge of all UEs belonging to a group and send a service subscription request.

In step 430, the PCF 405 may transmit the identification information (e.g., the ID of the UPF 407) of the UPF 407 requested to search using the GPSI and the UE IP address to the NEF 403 through the Npcf_management_Discovery response message. In order to search for the UPF 407, the NEF 403 may use any combination of an UE IP address (IPv4 address or IPv6 prefix), an UE MAC address, an AF-Service-Identifier, a DNN. DN information (e.g., S-NSSAI), SUPI, or GPSI values.

In step 440, in order to subscribe or cancel a subscription to the packet delay status event exposure service, the NEF 403 may transmit a service subscription request or cancellation message (Nupf_EventExposure_Subscribe/Unsubscribe request) to the UPF 407. In order for the NEF 403 to cancel a subscription, the NEF 403 may transmit together a subscription correlation ID identifying an existing event service subscription to the UPF 407. When the NEF 403 receives an AF-Service-Identifier as a target of event reporting value in step 410, the NEF 403 may change the AF-Service-Identifier to a DNN/S-NSSAI combination. The NEF 403 may add an address thereof to the information received from the AF 401 and notification target address in step 410 and transmit it to the UPF 407. This is for the NEF 403 to receive a notification of a change when a change occurs in information subscribed to the UPF 407. When the service subscription is authorized by the UPF 407, the UPF 407 may store the event trigger and the identity of the requester.

The UPF 407 may perform a packet delay status event exposure service for a specific QoS flow of a specific UE through target of event reporting information. The specific QoS flow may be specified through traffic detection information in target of event reporting information. The UPF 407 may report to the event exposure service subscriber at an event detection/periodic/one time period according to the reporting frequency in the event filter information. The UPF 407 may report a DL packet delay/UL packet delay/round trip packet delay value to the subscriber every corresponding period. The event detection period may be notified to the subscriber when the packet delay is a threshold or more. The periodic period may be reported to the subscriber at every reporting time period interval. One time period may be reported to the subscriber when a PDU session in which the corresponding QoS flow flows is released. Event reporting information may include an event reporting mode and include an immediate reporting flag indicating whether to immediately send reporting to the subscriber. A minimum waiting time if reporting frequency indicates a time value to wait until at least the next report after detecting an event and reporting it to the subscriber in an event detection period. This is to prevent frequent reports due to events occurring too frequently.

The UPF 407 may measure the DL. UL, and round trip packet delay of an N3 interface with the NG-RAN in order to measure the packet delay for a specific QoS flow, and the packet delay between the UE and the NG-RAN may be measured by requesting to the NG-RAN.

In step 450, the UPF 407 may transmit a Nupf_EventExposure_Subscribe/Unsubscribe response message to the NEF 403 in response to a subscription or cancellation of a subscription to a service. The message may include a subscription correlation ID and an expiry time.

In step 460, the NEF 403 may transmit an Nnef_EventExposure_Subscribe/Unsubscribe response message to the AF 401 in response to a subscription or cancellation of a subscription to a service. The message may include a subscription correlation ID and an expiry time.

In step 470, the UPF 407 may detect occurrence of an event to transmit the event report together with a time stamp to the NEF 403 through a Nupf_EventExposure_Notify message.

The NEF 403 may store event report information together with a time stamp in a UDR (not illustrated) using a Nudr_DM_Create or Nudr_DM_Update message.

In step 480, the NEF 403 may transmit the received event report to the AF 401 through Nnef_EventExposure_Notify.

Figure 5:
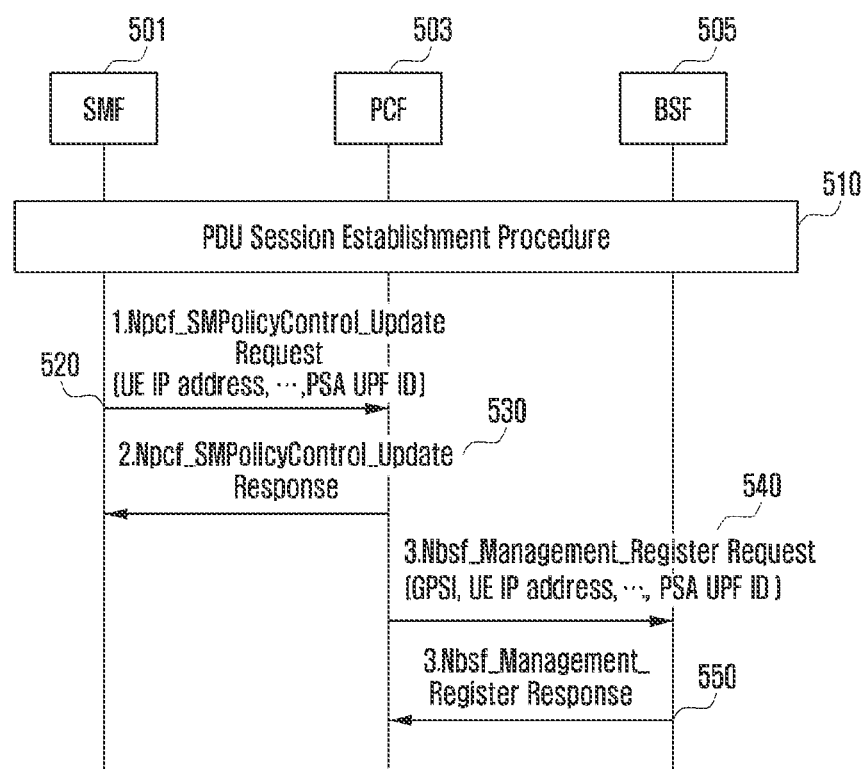
FIG. 5 illustrates a procedure for storing a UPF ID in order for a PCF and a BSF to search for a UPF according to an embodiment of the disclosure.

FIG. 5 illustrates a procedure for storing a UPF ID in order for a PCF and a BSF to search for a UPF according to an embodiment of the disclosure.

The procedure of the embodiment illustrated in FIG. 5 may be performed by an SMF initiated SM policy association modification procedure performed during a PDU session establishment procedure.

With reference to FIG. 5, in step 510, a PDU session establishment procedure may be performed between an SMF 501, a PCF 503, and a BSF 505.

In step 520, in order to update the SM policy association of the generated PDU session, the SMF 501 transmits an Npcf_SMPolicyControl_Update request message to the PCF 503. Parameters included in the message may include at least one of an SM policy association ID. IPv4 address and/or IPv6 network prefix, user location information. UE time zone, serving network. RAT type, session AMBR, or subscribed default QoS information, DN authorization profile index, MAC address, port number of manageable Ethernet port, UE-DS-TT residence time and port management information container, MA PDU request indication, or MA PDU network-upgrade allowed indication. In particular, the SMF 501 may add a (PSA) UPF ID and a (PSA) UPF address in charge of the corresponding PDU session to the message and transmit the message to the PCF 503. Thereby, the PCF 503 may store the UPF ID and UPF address in charge of the generated PDU session.

In step 530, the PCF 503 may transmit an Npcf_SMPolicyControl_Update response message to the SMF 501 in response to the Npcf_SMPolicyControl_Update request message.

In step 540, the PCF 503 may register PDU session related information to the BSF 505 through the Nbsf_Management_Register request message. The registration information may include at least one of an UE address(es), SUPI. GPSI, DNN, DN information (e.g., S-NSSAI), PCF address(es), PCF id, or PCF set ID. In order to register UPF information in the BSF 505, the PCF 503 may additionally provide the UPF address (es) and the UPF id to the BSF 505. Thereby, the BSF 505 may store the UPF ID and UPF address in charge of the generated PDU session.

In step 550, the BSF 503 may transmit an Nbsf_Management_Register response message to the PCF 503 in response to the Nbsf_Management_Register request message.

Figure 6:
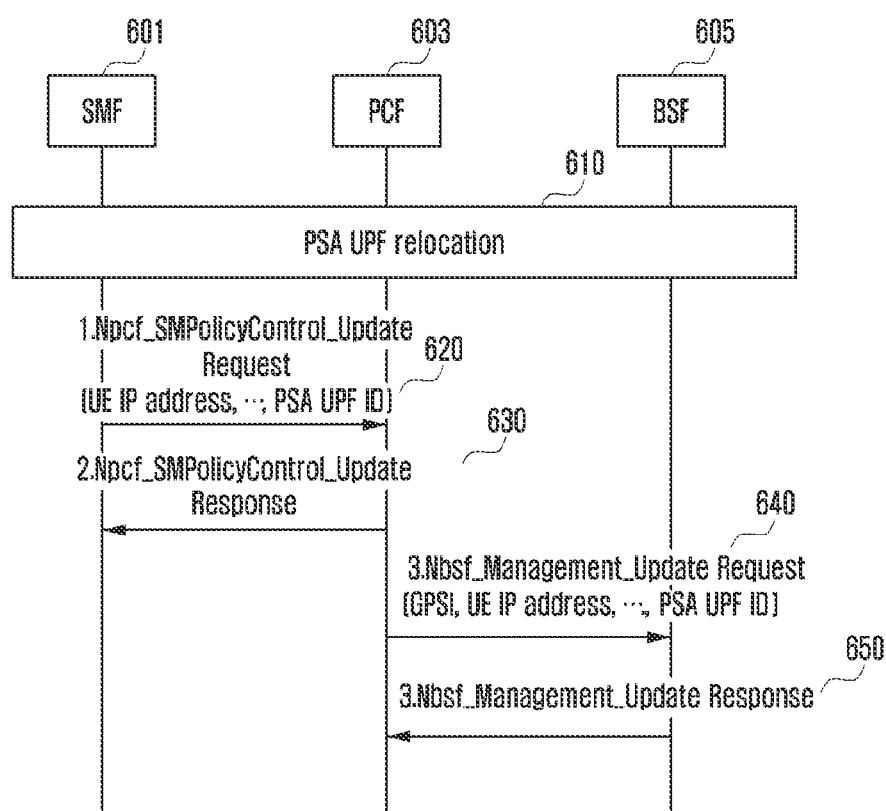
FIG. 6 illustrates a procedure for updating a (PSA) UPF ID in a PCF and a BSF in the case that a PSA UPF is relocated according to an embodiment of the disclosure.

FIG. 6 illustrates a procedure for updating a (PSA) UPF ID in a PCF and a BSF in the case that a PSA UPF is relocated according to an embodiment of the disclosure.

With reference to FIG. 6, in step 610, the PSA UPF may be relocated.

In step 620, after the PSA UPF is relocated, in order to update the SM policy association of a PDU session, an SMF 601 may transmit an Npcf_SMPolicyControl_Update request message to a PCF 603. Parameters included in the message may include at least one of an SM policy association ID, IPv4 address and/or IPv6 network prefix, user location information, UE time zone, serving network, RAT type, session AMBR, or subscribed default QoS information, DN authorization profile index. MAC address, port number of manageable Ethernet port, UE-DS-TT residence time and port management information container, MA PDU request indication, or MA PDU network-upgrade allowed indication. In particular, the SMF 601 may add the (PSA) UPF ID and (PSA) UPF address changed by PSA UPF relocation to the message to transmit the message to the PCF 603. Thereby, the PCF 603 may store the UPF ID and UPF address changed by the PSA UPF relocation.

In step 630, the PCF 603 may transmit an Npcf_SMPolicyControl_Update response message to the SMF 601 in response to the Npcf_SMPolicyControl_Update request message.

In step 640, the PCF 603 may update the PDU session related information to a BSF 605 through the Nbsf_Management_Update request message. Parameters included in the message may include at least one of a binding identifier for a PDU session, a UE address(es), or a PCF id. In order to update the UPF information to the BSF 605, the PCF 603 may additionally provide an UPF address (es) and an UPF id to the BSF 605. Thereby, the BSF 605 may store the UPF ID and UPF address changed by PSA UPF relocation.

In step 550, the BSF 605 may transmit an Nbsf_Management_Register response message to the PCF 603 in response to the Nbsf_Management_Update request message.

Hereinafter, the event exposure service parameters that should be added to support the packet delay status event exposure service will be described.

TABLE 1

| Enumeration UpfEvent | | |
|---|---|---|
| Enumeration value | Description | Applicability |
| PDS | Packet Delay Status | PacketDelayStatus |

[Table 1] adds a PDS, which is a new event ID to a UPF event table for the packet delay status event.

TABLE 2

| Definition of type NupfEventExposure | | | | | |
|---|---|---|---|---|---|
| Attribute name | Data type | P | Cardinality | Description | Applicability |
| Supi | Supi | C | 0 . . . 1 | Subscription Permanent Identifier (NOTE) | |
| Gpsi | Gpsi | C | 0 . . . 1 | Generic Public Subscription Identifier (NOTE) | |
| anyUe Ind | boolean | C | 0 . . . 1 | This IE shall be present if the event subscription is applicable to any UE. Default value "FALSE" is used, if not present (NOTE) | |
| groupId | GroupId | C | 0 . . . 1 | Identifies a group of UEs. (NOTE) | |
| pduSeId | PduSessionId | C | 0 . . . 1 | PDU session ID (NOTE) | |
| maxWait Time | DateTime | C | 0.1 | Maximum wait time after reporting | Packet Delay Status |

[Table 2] adds a maxWaitTime, which is a new type for the packet delay status event to a type definition table.

TABLE 3

Type EventSubscription

| Attribute name | Data type | P | Cardinality | Description | Applicability |
|---|---|---|---|---|---|
| event | SmfEvent | M | 1 | Subscribed events | |
| dnaiChType | DnaiChangeType | C | 0...1 | For event UP path change, this attribute indicates whether the subscription is for early, late, or early and late DNAI change notification shall be supplied. | |
| dddTraDes | DddTrafficDescriptor | C | 0...1 | The traffic descriptor of the downlink data source. May be included for event "downlink data delivery status". | Downlink Data Delivery Status |
| dddStati | array (DddStatus) | C | 1...N | May be included for event "downlink data delivery status". The subscribed stati (discarded, transmitted, buffered) for the event. If omitted all stati are subscribed. | Downlink Data Delivery Status |
| pdsTraDes | PdsTrafficDescriptor | C | | The traffic descriptor of the target QoS Flow. | Packet Delay Status |
| pdsNotEve | PdsTrafficDescriptor | C | | For which Event Item is needed for detection. | Packet Delay Status |
| pdsNotThr | Notification_threshold | C | | Frequency for Event detection | Packet Delay Status |

[Table 3] adds PdsTrafficDescirptor, PdsTrafficDescirptor, and Notification_threshold types, which are new EventSubscription types for a packet delay status event.

TABLE 4

Enumeration NotificationMethod_PDS

| Enumeration value | Description | Applicability |
|---|---|---|
| PERIODIC | The notification is periodically sent. | |
| PDU_SESSION_RELEASE | The notification is only sent when PDU Session is released | |
| ON_EVENT_DETECTION | The notification is sent each time the event is detected. | |

TABLE 5

Enumeration NotificationEventItem

| Enumeration value | Description | Applicability |
|---|---|---|
| DL_PACKET_DELAY | Downlink packet delay between UE and PSA UPF | |
| UP_PACKET_DELAY | Uplink packet delay between UE and PSA UPF | |
| ROUND_TRIP_DELAY | Round trip packet delay between UE and PSA UPF | |

TABLE 6

Enumeration Notification_threshold

| Enumeration value | Description | Applicability |
|---|---|---|
| DL_PACKET_DELAY_threshold | Threshold for Downlink packet delay | |
| UP_PACKET_DELAY_threshold | Threshold for Uplink packet delay | |
| ROUND_TRIP_DELAY_threshold | Threshold Round trip packet delay | |

[Table 4], [Table 5], and [Table 6] define a new enumeration type for event filter information (frequency and event items) of a packet delay status event.

TABLE 7

Definition of type PdsTrafficDescriptor

| Attribute name | Data type | P | Cardinality | Description | Applicability |
|---|---|---|---|---|---|
| ipv4Addr | Ipv4Addr | C | 0...1 | Ipv4 address of the source (UE IP address) | Packet Delay Status |
| ipv6Addr | Ipv6Addr | C | 0...1 | Ipv6 address of the source (UE IP address) | Packet Delay Status |
| port | Uinteger | O | 0...1 | Port number of the of the source (UE) | Packet Delay Status |
| ipv4Addr | Ipv4Addr | C | 0...1 | Ipv4 address of the destination (Server) | Packet Delay Status |
| ipv6Addr | Ipv6Addr | C | 0...1 | Ipv6 address of the destination (Server) | Packet Delay Status |
| port | Uinteger | O | 0...1 | Port number of the of destination (Server) | Packet Delay Status |
| Protocol ID | | | | | Packet Delay Status |

NOTE:
At least one of the "ipv4Addr" attribute or the "ipv6Addr" attribute shall be included.

[Table 7] defines a PdsTrafficDescriptor type for the packet delay status event. Through the information, the UPF may search for specific QoS flow.

TABLE 8

Nupf_EventExposure specific Data Types

| Data type | Section defined | Description | Applicability |
|---|---|---|---|
| PdsTrafficDescirptor | x.x.x.x | Traffic descriptor of the target QOS Flow | PacketDelay Status |
| NotificationEventItem | x.x.x.x | Notification Event Item | PacketDelay Status |

TABLE 8-continued

Nupf_EventExposure specific Data Types

| Data type | Section defined | Description | Applicability |
|---|---|---|---|
| Notification_threshold | x.x.x.x | Threshold value for frequency (event detection) | PacketDelay Status |

[Table 8] defines newly defined data types for a packet delay status event.

TABLE 9

Definition of type EventNotification

| Attribute name | Data type | P | Cardinality | Description | Applicability |
|---|---|---|---|---|---|
| event | SmfEvent | M | 1 | Event that is notified. | |
| time Stamp | DateTime | M | 1 | Time at which the event is observed. | |
| supi | Supi | C | 0 . . . 1 | Subscription Permanent Identifier. It is included when the subscription applies to a group of UE(s) or any UE. | |
| gpsi | Gpsi | C | 0 . . . 1 | Identifies a GPSI. It shall contain an MSISDN. It is included when it is available and the subscription applies to a group of UE(s) or any UE. | |
| source Dnai | Dnai | C | 0 . . . 1 | Source DN Access Identifier. Shall be included for event "UP_PATH_CH" if the DNAI changed (NOTE 1, NOTE 2). | |
| target Dnai | Dnai | C | 0 . . . 1 | Target DN Access Identifier. Shall be included for event "UP_PATH_CH" if the DNAI changed (NOTE 1, NOTE 2). | |
| dnaiChg Type | Dnai Change Type | C | 0 . . . 1 | DNAI Change Type. Shall be included for event "UP_PATH_CH". | |
| sourceUe Ipv4Addr | Ipv4Addr | O | 0 . . . 1 | The IPV4 Address of the served UE for the source DNAI. May be included for event "UP_PATH_CH". | |
| dlPacket Delay | DateTime | C | 0 . . . 1 | Downlink Packet Delay time between UE and PSA UPF. Shall be included for event "PDS" if DLPacketDelay is requested | Packet Delay Status |
| ulPacket Delay | DateTime | C | 0 . . . 1 | Uplink Packet Delay time between UE and PSA UPF. Shall be included for event "PDS" if ULPacketDelay is requested. | Packet Delay Status |

TABLE 9-continued

Definition of type EventNotification

| Attribute name | Data type | P | Cardinality | Description | Applicability |
|---|---|---|---|---|---|
| roundtrip Packet Delay | DateTime | C | 0 . . . 1 | RoundTrip Packet Delay time between UE and PSA UPF. Shall be included for event "PDS" if RoundTrip PacketDelay is requested. | Packet Delay Status |

Figure 7:
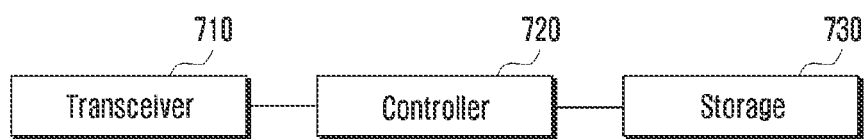
FIG. 7 is a block diagram illustrating a constitution of a terminal according to an embodiment of the disclosure.

[Table 9] defines newly defined EventNotification types for a packet delay status event. FIG. 7 is a block diagram illustrating a constitution of a terminal according to an embodiment of the disclosure.

Figure 8:
FIG. 8 is a block diagram illustrating a constitution of a network entity according to an embodiment of the disclosure.

With reference to FIG. 8, the terminal according to an embodiment of the disclosure may include a transceiver 710 and a controller 710 for controlling overall operations thereof. The transceiver 710 may include a transmitter and a receiver. The terminal may include a storage 730.

The transceiver 710 may transmit and receive signals to and from other network entities.

The storage 730 may store various types of information such as information for an operation of the terminal and information received from other network entities.

The controller 720 may control the terminal to perform any one operation of the above-described embodiments. The controller 720 and the transceiver 710 do not necessarily have to be implemented into separate modules, and may be implemented into a single component in the form of a single chip. The controller 720 and the transceiver 710 may be electrically connected. For example, the controller 720 may be a circuit, an application-specific circuit, or at least one processor. Further, operations of the terminal may be realized by providing the memory device 730 storing the corresponding program code in an arbitrary component in the terminal.

FIG. 8 is a block diagram illustrating a constitution of a network entity according to an embodiment of the disclosure.

The network entity of the disclosure is a concept including a network function according to a system implementation.

With reference to FIG. 8, a network entity according to an embodiment of the disclosure may include a transceiver 810 and a controller 820 for controlling overall operations of the network entity. The transceiver 810 may include a transmitter and a receiver. The network entity may include a storage 830.

The transceiver 810 may transmit and receive signals to and from other network entities.

The storage 830 may store various types of information such as information for an operation of the network entity and information received from other network entities.

The controller 820 may control the network entity to perform any one operation of the above-described embodiments. The controller 820 and the transceiver 810 do not necessarily have to be implemented into separate modules, and may be implemented into a single component in the form of a single chip. The controller 820 and the transceiver 810 may be electrically connected. For example, the controller 820 may be a circuit, an application-specific circuit, or at least one processor. Further, operations of the network entity may be realized by providing the memory device 830 storing the corresponding program code in an arbitrary component in the network entity.

The network entity may be any one of a base station (RAN. NG-RAN, eNB, gNB, NB), AMF, SMF, PCF, UDM, AUSF, AF, BSF, NEF, or UPF.

It should be noted that the constitution diagrams illustrated in FIGS. 1 to 8, diagrams of a control/data signal transmission method, operation procedure diagrams, and constitution diagrams are not intended to limit the scope of the disclosure. That is, all components, entities, or steps of operation described in FIGS. 1 to 8 should not be construed as essential components for implementation of the disclosure, and the disclosure may be implemented within a range that does not impair the essence of the disclosure even by including only some components.

The operations of the base station or the terminal described above may be realized by providing a memory device storing the corresponding program code in an arbitrary component in the base station or the terminal device. That is, a controller of the base station or the terminal device may execute the above-described operations by reading and executing the program code stored in the memory device by a processor or a central processer (CPU).

Various components and modules of the entity, base station, or terminal device described in this specification may be operated using a hardware circuit such as a combination of a complementary metal oxide semiconductor-based logic circuit, firmware, software, and/or hardware and firmware and/or software inserted into a machine readable medium. For example, various electrical structures and methods may be implemented using electrical circuits such as transistors, logic gates, and application specific integrated circuits.

In the specific embodiments of the disclosure described above, components included in the disclosure were expressed in the singular or plural according to the presented specific embodiments. However, the singular or plural expression is appropriately selected for a situation presented for convenience of description, and the disclosure is not limited to the singular or plural components, and even if a component is represented in the plural, it may be formed with the singular, or even if a component is represented in the singular, it may be formed with the plural.

Embodiments of the disclosure disclosed in this specification and drawings present specific examples to easily describe the technical content of the disclosure and to help the understanding of the disclosure, and are not intended to limit the scope of the disclosure. That is, it is apparent to those of ordinary skill in the art to which other modifications based on the technical spirit of the disclosure may be implemented. Further, each of the above embodiments may be operated in combination with each other, as needed. For example, an embodiment of the disclosure and parts of another embodiment may be combined to operate a base station and a terminal. Further, the embodiments of the disclosure are applicable to other communication systems, and other modifications based on the technical spirit of the embodiments may also be implemented.

What is claimed is:

1. A method performed by a user plane function (UPF) in a communication system, the method comprising:
   receiving, from an application function (AF), through a network exposure function (NEF), a first message for requesting a notification of a result of a quality of service (QoS) monitoring;
   obtaining information on the QoS monitoring for a QoS flow; and
   transmitting, to the AF, via an interface between the UPF and the AF, a second message including the information on the QoS monitoring for the QoS flow.

2. The method of claim 1, wherein transmitting the second message comprise transmitting the second message, to the AF, through a network function (NF) different from a session management function (SMF), and
   wherein the different NF comprises the NEF.

3. The method of claim 1, wherein the second message further includes a time stamp related to the information on the QoS monitoring for the QoS flow.

4. The method of claim 1, wherein the QoS monitoring comprises a packet delay monitoring.

5. The method of claim 1, wherein the second message further includes an Nupf_EventExposure_Notify message.

6. A method performed by an application function (AF) in a communication system, the method comprising:
   transmitting, to a user plane function (UPF), through a network exposure function (NEF), a first message for requesting a notification of a result of a quality of service (QoS) monitoring; and
   receiving, from the UPF, via an interface between the UPF and the AF, a second message including information on the QoS monitoring for a QoS flow.

7. The method of claim 6, wherein receiving the second message comprises receiving the second message, from the UPF, through a network function (NF) different from a session management function (SMF), and
   wherein the different NF comprises the NEF.

8. The method of claim 6, wherein the second message further includes a time stamp related to the information on the QoS monitoring for the QoS flow.

9. The method of claim 6, wherein the QoS monitoring comprises a packet delay monitoring.

10. The method of claim 6, wherein the second message further includes an Nupf_EventExposure_Notify message.

11. A user plane function (UPF) in a communication system, the UPF comprising:
    a transceiver; and
    a controller configured to:
      receive, from an application function (AF), through a network exposure function (NEF), via the transceiver, a first message for requesting a notification of a result of a quality of service (QOS) monitoring,
      obtain information on the QoS monitoring for a QoS flow, and
      transmit, to the AF, via the transceiver, via an interface between the UPF and the AF, a second message including the information on the QoS monitoring for the QoS flow.

12. The UPF of claim 11, wherein the controller is further configured to transmit the second message, to the AF, via the transceiver, through a network function (NF) different from a session management function (SMF), and
    wherein the different NF comprises the NEF.

13. The UPF of claim 11, wherein the second message further includes a time stamp related to the information on the QoS monitoring for the QoS flow.

14. The UPF of claim 11, wherein the QoS monitoring comprises a packet delay monitoring.

15. The UPF of claim 11, wherein the second message further includes an Nupf_EventExposure_Notify message.

16. An application function (AF) in a communication system, the AF comprising:
a transceiver; and
a controller configured to:
transmit, to a user plane function (UPF), through a network exposure function (NEF), via the transceiver, a first message for requesting a notification of a result of a quality of service (QOS) monitoring, and
receive, from the UPF, via the transceiver, via an interface between the UPF and the AF, a second message including information on the QoS monitoring for a QoS flow.

17. The AF of claim 16, wherein the controller is further configured to receive the second message, from the UPF, via the transceiver, through a network function (NF) different from a session management function (SMF), and
wherein the different NF comprises the NEF.

18. The AF of claim 16, wherein the second message further includes a time stamp related to the information on the QoS monitoring for the QoS flow.

19. The AF of claim 16, wherein the QoS monitoring comprises a packet delay monitoring.

20. The AF of claim 16, wherein the second message further includes an Nupf_EventExposure_Notify message.

* * * * *